F. & N. M. SPRANGER.
SPLIT RIM CONSTRUCTION.
APPLICATION FILED JAN. 11, 1912.

1,088,108.

Patented Feb. 24, 1914.

Witnesses
Chas. W. Stauffiger.
C. R. Stichney

Inventor
Frank Spranger,
Nicholas M. Spranger,
By
Attorneys

UNITED STATES PATENT OFFICE.

FRANK SPRANGER AND NICHOLAS M. SPRANGER, OF DETROIT, MICHIGAN.

SPLIT-RIM CONSTRUCTION.

1,088,108.   Specification of Letters Patent.   Patented Feb. 24, 1914.

Application filed January 11, 1912. Serial No. 670,682.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Split-Rim Construction, of which the following is a specification, reference being had therein to the accompanying drawings.

This invention relates to improvements in wheel rims and more particularly to split rims for pneumatic and other vehicle tires.

The object of the invention is to provide a simple and conveniently operated device for drawing the adjacent ends of the split rim toward each other and detachably securing them in place, the invention consisting in the matters hereinafter set forth and more particularly pointed out in the claims, reference being had to the accompanying drawing, in which:—

Figure 1:
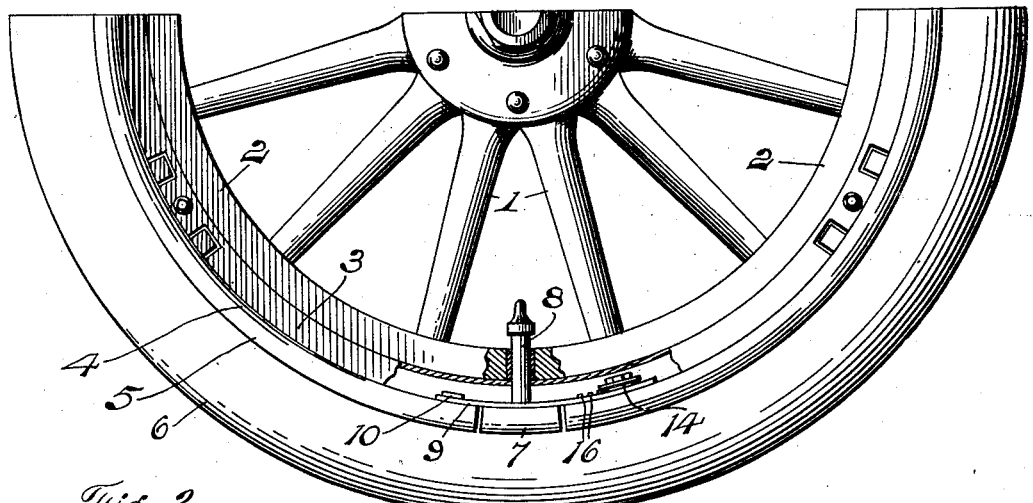
Figure 2:
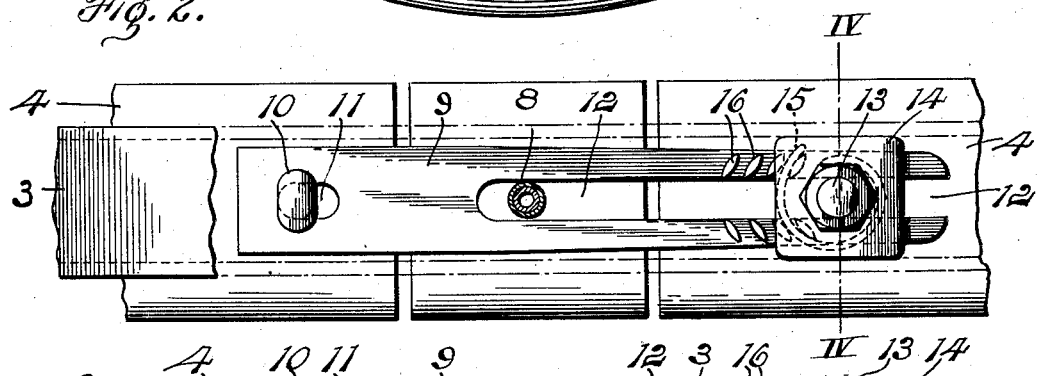
Figure 3:
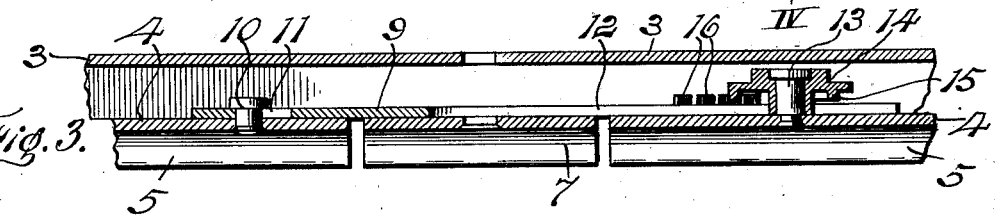
Figure 4:
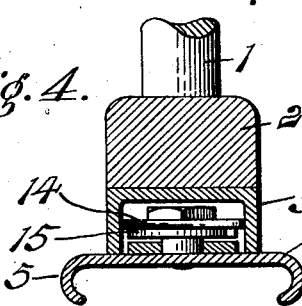

Figure 1, is a side elevation of a portion of a wheel with a rim in place thereon embodying the invention, the parts being broken away to show the construction; Fig. 2, is an enlarged detail of a portion of the rim showing the fastening means in plan view; Fig. 3, is a longitudinal section of Fig. 2; and Fig. 4, is a transverse section on the line IV of Fig. 2.

As shown in the drawing 1 represents a wheel of any desired form and construction provided with a wood felly 2 and secured upon the wood felly in the usual manner is a channel rim 3. A demountable rim 4 having inturned side flanges 5 to engage and hold a pneumatic tire 6, is secured in place upon the channel rim 3. This demountable rim is split or cut in two transversely, at two points forming a short section 7 provided with an opening for the valve stem 8 which extends inward through an opening in the channel rim and felly.

To draw the two ends of the split rim toward the rim section 7 and thus contract the demountable rim upon the channel rim, a locking bar 9 is pivotally attached to one of said ends by means of a stud 10 on the rim having an elongated head to engage a slot 11 in the bar. Said slot extends longitudinally of the bar and the head on the stud extends transversely of the rim and thus the bar may be engaged with the stud by turning the same at right angles to the rim and slipping it over the head of the stud. It may then be turned upon the stud longitudinally of the rim into operative position and will be held from disengagement with the stud by its elongated head. The opposite end of the bar is provided with a slot 12 extending inward from said end to receive the valve stem 8, said bar being of a length to extend across said section and into engagement with a locking member on the opposite end of the demountable rim. This locking member comprises a stud 13 rigidly secured to the end of the rim and extending inward into the channel of the channel rim 3. Sleeved upon the stud to turn freely thereon is a locking member 14 which is held in place thereon by a head on the stud. This locking member is provided with a laterally extending flange having a rib or thread 15 on its lower side which is arranged in the form of a spiral around the axis upon which the member turns. Upon the inner face of the locking bar 9 is a series of lugs 16 which perform the function of threads to engage with the spiral thread or rib 15. The member 14 is provided with a hexagonal end or head by means of which it may be turned upon its stud by the engagement of a suitable wrench therewith.

In assembling the demountable rim it is contracted by bringing the slotted end of the locking bar beneath the locking member and engaging the end of the thread 15 of said member with the first of the series of lugs 16. Then by turning the locking member, the thread will, by reason of its spiral construction, draw the locking bar longitudinally and thus pull the two ends of the split rim toward the rim section 7 which will not be disturbed by such movement. The liability of breaking or injuring the valve stem is thus obviated and with a few turns of the locking member by means of a wrench, the ends of the split rim are tightly clamped together before placing upon the channel rim. By providing a channel shaped rim to support the demountable rim, the space required for the locking means between the felly and the demountable rim is practically all closed by the side flanges of the channel.

In placing the demountable rim upon the channel rim, the valve stem 8 of the tire is first inserted through the opening in the top of the felly and the lower edge of the demountable rim readily slipped into place laterally upon the channel rim and secured in place by any suitable locking means as in the usual manner.

Having thus fully described our invention what we claim is:—

1. The combination of a split rim, an intermediate short rim section between the ends of said rim adapted to receive and hold a valve stem of a tire, a locking bar pivotally attached to one end of the rim and extending across said rim section into engagement with the other end of the rim, said bar having an interrupted thread, and a rotatable member on the other end of the rim to engage said bar and draw the ends of the rim toward said rim section.

2. The combination of a split rim provided with means for holding a tire in place thereon, a short rim section interposed between the ends of said split rim, an inwardly extending valve stem on the tire, a locking bar attached to one end of the split rim and provided with a longitudinal slot for said stem, a rotatable member secured to the other end of the split rim and engaging the locking bar to draw the ends of the split rim toward the rim section.

3. The combination of a split rim, a bar pivotally attached to one end of said rim, a rotatable member secured upon the other end of the rim and provided with a spiral thread on its under side and an interrupted thread on the adjacent side of the bar engaged by the thread to draw the ends of the rim toward each other when the member is turned.

4. The combination of a split rim, a locking bar pivotally attached at one end to one end of the rim, a stud secured to the other end of the rim, a rotatable locking member on the stud provided with a spirally arranged thread and a series of members on the bar adapted to be engaged by said thread.

5. The combination with an inner wheel rim having outwardly extending flanges, a demountable rim adapted to engage and rest upon said flanges of the inner rim and provided with means for holding a tire, said demountable rim being severed transversely at one side, a rim section interposed between the severed ends of the demountable rim and provided with an opening for receiving a valve stem of the tire, and means comprising a slotted bar and rotatable member respectively attached to the severed ends of the demountable rim, said bar extending across the rim section between said demountable rim and inner rim to draw the ends of the severed rim toward the rim section, and hold the same contracted.

6. The combination of a split rim, a locking bar pivotally attached to one end of said rim, a stud secured to the other end of said rim, a locking member upon the stud to turn freely thereon and provided with a spirally arranged thread, and a series of inwardly extending lugs on the bar adapted to be engaged by the spiral thread.

7. The combination of a split rim, a short rim section interposed between the ends of said split rim having an opening to receive and hold a valve stem, a locking bar pivotally and detachably attached to one end of the split rim and provided with a longitudinal slot extending inward from its opposite end to receive said stem, a stud upon the opposite end of the split rim extending inward through said slot in the bar, a locking member upon the stud adapted to turn freely thereon and provided with a laterally extending flange having a spirally arranged thread projecting toward the face of said bar, and a series of lugs on the bar adapted to be engaged by the spiral thread.

In testimony whereof we affix our signatures in presence of two witnesses.

FRANK SPRANGER.
NICHOLAS M. SPRANGER.

Witnesses:
OTTO F. BARTHEL,
C. R. STICKNEY.